(12) United States Patent
Paranchych

(10) Patent No.: US 6,725,062 B1
(45) Date of Patent: Apr. 20, 2004

(54) METHOD TO INCREASE THE NUMBER OF SIMULTANEOUS USERS IN A CONTROL HOLD MAC STATE IN CDMA

(75) Inventor: David W. Paranchych, Richardson, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/456,905

(22) Filed: Dec. 8, 1999

(51) Int. Cl.$^7$ .................. H04B 1/38; H04B 7/216; H04Q 7/20; H04Q 7/00; H04Q 7/28
(52) U.S. Cl. .................. 455/561; 455/450; 455/455; 455/456.5; 455/463; 370/328; 370/329; 370/335; 370/342; 370/441; 370/341
(58) Field of Search .................. 455/450, 453, 455/455, 456.5, 463, 464, 561; 370/348, 342, 441, 341, 350, 503, 465, 209, 208, 328, 320, 335, 329; 375/130, 138, 148

(56) References Cited

U.S. PATENT DOCUMENTS

| | | | | |
|---|---|---|---|---|
| 6,091,759 A | * | 7/2000 | Rotstein et al. | 375/140 |
| 6,337,983 B1 | * | 1/2002 | Bonta et al. | 455/437 |
| 6,415,153 B1 | * | 7/2002 | Liew | 455/453 |
| 6,621,809 B1 | * | 9/2003 | Lee et al. | 370/335 |

OTHER PUBLICATIONS

David Paranchych. "An Extension to the Slotted Substrate of the Control Hold State," *Telecommunications Industry Association*, NORTEL Northern Telecom, Sep. 14, 1998, 6 pages.

David Paranchych. "Forward Link Walsh Code Sharing in the Control Hold Normal Substrate," *Telecommunications Industry Association*, NORTEL Networks, Nov. 18, 1998, 6 pages.

\* cited by examiner

*Primary Examiner*—William Trost
*Assistant Examiner*—Meless Zewdu
(74) *Attorney, Agent, or Firm*—Carr LLP

(57) ABSTRACT

A method for sharing Walsh codes between at least two mobile stations operating simultaneously in a Control Hold Medium Access Control (MAC) state in Code Division Multiple Access (CDMA), whereby for each respective mobile station, upon entry of the respective mobile station into the Control Hold MAC state, a gating rate 1/x to be used by the respective mobile station, wherein x is greater than one, is determined. A Walsh code being used by less than x mobile stations in the control hold MAC state is identified and allocated to the respective mobile station to thereby define a channel of communication for the respective mobile station. A time slot which is not being used by any mobile stations using the identified Walsh code in the control hold MAC state, is identified and allocated to the respective mobile station, thereby permitting at least one signal to be transmitted between a base station and the respective mobile station using the identified Walsh code during the time slot allocated to the respective mobile station.

28 Claims, 3 Drawing Sheets

METHOD TO INCREASE THE NUMBER OF SIMULTANEOUS USERS IN A CONTROL HOLD MAC STATE IN CDMA

TECHNICAL FIELD

The invention relates generally to wireless communications and, more particularly, to the use of Medium Access Control (MAC) states during CDMA wireless communications.

BACKGROUND

Code Division Multiple Access (CDMA), also referred to as "spread spectrum", has become a well-known method by which wireless communications are implemented. In a CDMA wireless communications network, a form of multiplexing is used whereby a transmitter at a base station encodes a signal using a pseudo-random sequence which a mobile station of a user also knows and can use to decode the signal when the signal is received. In some CDMA implementations, each pseudo-random sequence used by the base station contains a finite length sequence, known as a Walsh code. The Walsh codes used by a particular base station are mutually orthogonal, which allows a user of a particular code to receive his or her desired signal from the base station without interference from other users served by the same base station. Interference between users served by the same base station is known as intra-cell interference.

Each Walsh code corresponds to a different communication channel. As a consequence, the number of channels which may be used in CDMA without intra-cell interference is limited to the number of Walsh codes which are available. The number of available Walsh codes is limited by available bandwidth and interference considerations. Given conventional bandwidth limitations, there are 128 orthogonal Walsh codes and, thus, 128 channels of communication, available for use in CDMA.

Because there are often more mobile stations that desire a channel and, hence, a Walsh code, than there are Walsh codes available, users of mobile stations must often wait until a Walsh code becomes available to make or receive a call on a mobile station. In an attempt to resolve this problem, quasi-orthogonal functions have been developed to generate more than 128 Walsh codes. Because conventional quasi-orthogonal functions are not truly orthogonal, the channels using such Walsh codes significantly increase interference for every mobile station being served by a particular base station in a CDMA network. When interference increases, transmission power must be increased. As transmission power is increased, the number of mobile stations which may be served by a base station in a CDMA network without waiting for a Walsh code to become available decreases.

Therefore, what is needed is a method by which an increased number of mobile stations may be served in a CDMA network without generating additional interference.

SUMMARY

The present invention, accordingly, provides a method for sharing Walsh codes between at least two mobile stations operating simultaneously in a Control Hold Medium Access Control (MAC) state in Code Division Multiple Access (CDMA), whereby, upon entry of a respective mobile station into the Control Hold MAC state, a gating rate of 1/x to be used by the respective mobile station is determined, wherein x is greater than one. A Walsh code being used by less than x mobile stations in the control hold MAC state is identified and allocated to the respective mobile station to thereby define a channel of communication for the respective mobile station. A time slot which is not being used by any mobile stations using the identified Walsh code in the control hold MAC state, is identified and allocated to the respective mobile station, thereby permitting at least one signal to be transmitted between a base station and the respective mobile station using the identified Walsh code during the time slot allocated to the respective mobile station.

By the use of the present invention, transmitted power on the forward link and reverse link is reduced over the prior art, thereby resulting in less interference and more network capacity. Furthermore, the limited number of Walsh codes is more efficiently used, thereby further increasing capacity.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in block or schematic diagram form in order not to obscure the present invention in unnecessary detail. Additionally, for the most part, details concerning wireless communications networks, CDMA, MAC states, timing considerations, and the like have been omitted inasmuch as such details are not necessary to obtain a complete understanding of the present invention and are within the skills of persons of ordinary skill in the relevant art.

Figure 1:
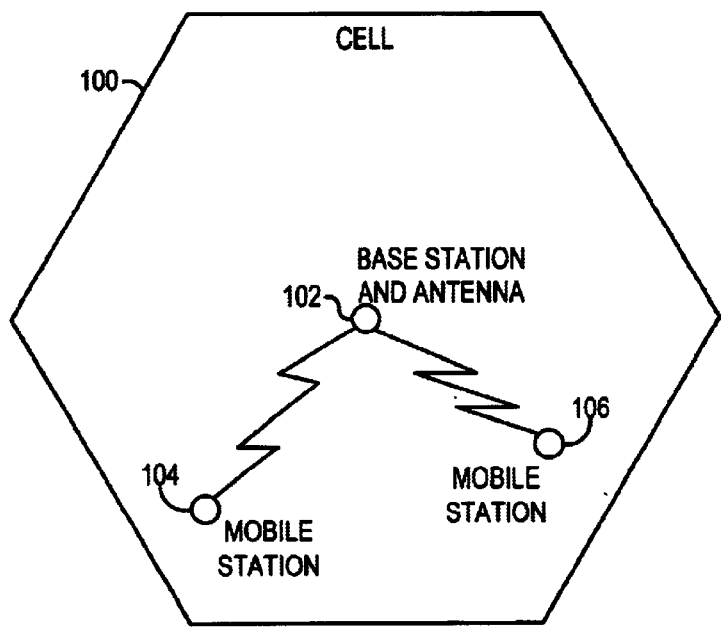
FIG. 1 is a schematic diagram of a wireless communications network having a base station and two mobile stations.

Referring now to FIG. 1 of the drawings, the reference numeral 100 generally designates one cell of a wireless communications network embodying features of the present invention. The cell 100 includes at least one base station 102, including an antenna (not shown), and at least two mobile stations 104 and 106.

The cell 100 preferably constitutes a cell of a CDMA wireless communications network, such as CDMA2000, which utilizes a technology referred to as Medium Access Control (MAC). As described in greater detail below with respect to FIG. 2, MAC is used to more efficiently utilize the limited number of Walsh codes and channels which are available under conventional standards.

Figure 2:
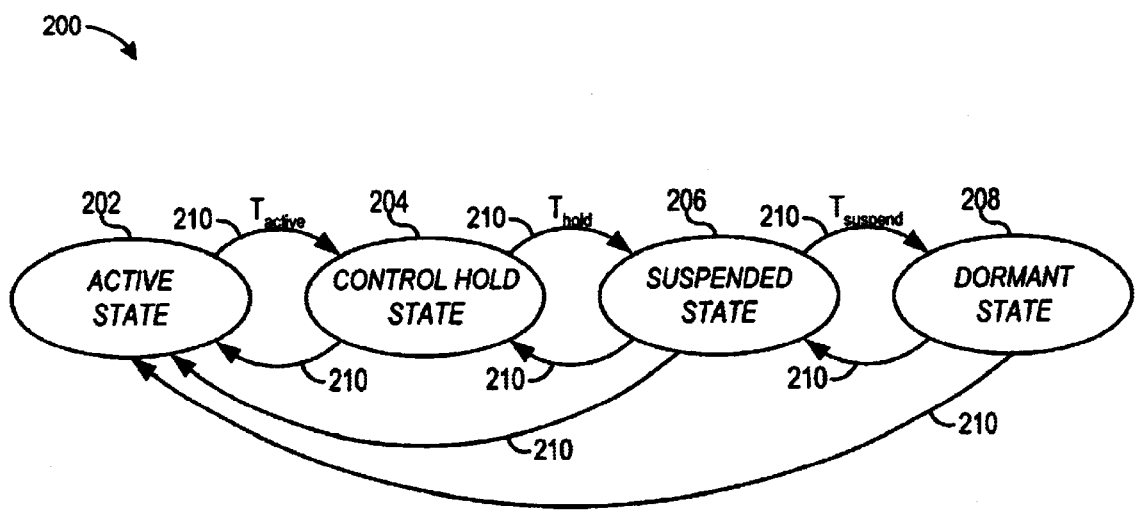
FIG. 2 is a state diagram showing four states in which each of the mobile stations of FIG. 1 may reside.

FIG. 2 is a state diagram 200 of a MAC, which diagram illustrates four different states, well-known in the art, in which the mobile station 104 or 106 may reside under MAC. Accordingly, the mobile station 104 or 106 may reside in an Active state 202, a Control Hold state 204, a Suspended state 206, or a Dormant state 208. The mobile 104 or 106 is allocated a Walsh code and a corresponding channel of communication in the Active state 202 and in the Control Hold state 204, but not in the Suspended state 206 nor in the Dormant state 208. The mobile stations 104 and 106 may transition between the states 202, 204, 206, and 208 as shown by the arrows 210. Three timers $T_{active}$, $T_{hold}$, and $T_{suspend}$ may also be used to trigger transitions between states. The MAC states and transitions between the states is considered to be well-known in the art and will, therefore, not be discussed further herein, except as relevant to the present invention.

Figure 3:
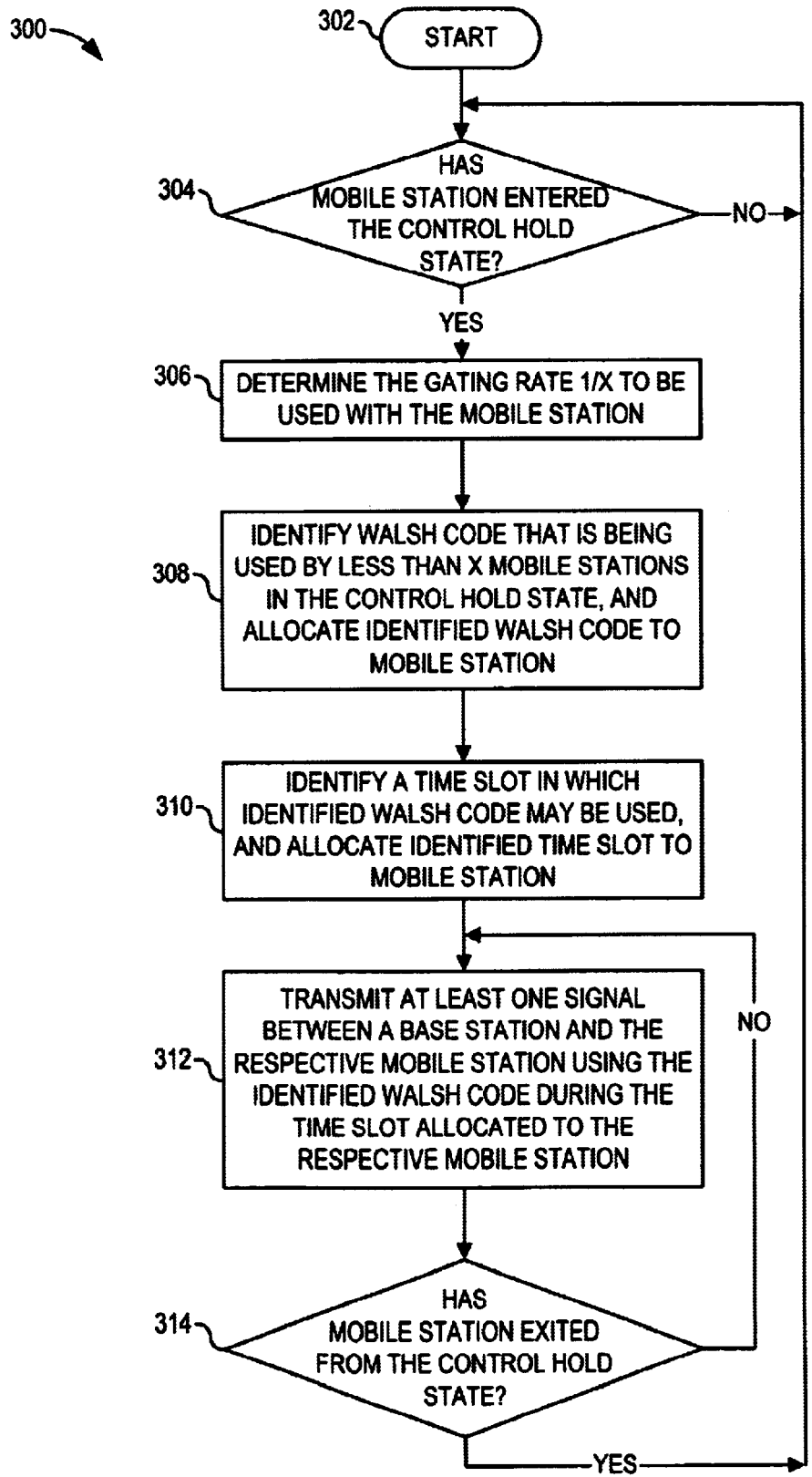
FIG. 3 is a flow chart illustrating control logic for the operation of the present invention.

FIG. 3 is a flowchart 302 of control logic implemented by a computer program code (not shown) residing in the base station 102 and a co-operating computer program (not shown) residing in each mobile station 104 and 106 as appropriate for utilizing Walsh codes when the mobile stations 104 and 106 are in the Control Hold state 204, in accordance with the present invention. For the sake of illustration, the control logic of FIG. 3 will described primarily with respect to the mobile station 104, it being understood that the control logic is applied in a similar manner for the mobile station 106 and any other mobile station served by the base station 102.

Accordingly, in step 302, the method is initiated in the base station 102 and, in step 304, a determination is made whether the mobile station 104 has entered the Control Hold state 204. If it determined that the mobile station 104 has entered the Control Hold state 204, then execution proceeds to step 306; otherwise, execution returns to step 304.

In step 306, a gating rate of 1/x is determined which is to be used with the mobile station 104. The gating rate and its determination is considered to be well-known in the art and, therefore, will not be described in further detail herein. In accordance with the present invention, the variable x must be an integer greater than 1, and is preferably 2, 4, or 8. For the sake of illustration, it will be assumed herein that x is determined to be 2. Upon determining the gating rate 1/x, execution proceeds to step 308.

In step 308, a Walsh code is identified which is being used by less than x mobile stations or, more specifically in the present example, less than 2 mobile stations in the Control Hold state 204 (FIG. 2), which mobile stations may be served by the base station 102 (FIG. 1) and/or by adjoining base stations (not shown). Thus, if there is one and only one other mobile station, e.g., the mobile station 106, that has entered and is currently in the Control Hold state 240, then the Walsh code allocated to the mobile station 106 is allocated for use to the mobile station 104, so that both the mobile stations 104 and 106 use the same Walsh code. If there are no other mobile stations that are in the Control Hold state 204, then a new Walsh code that is not being used by any mobile station is allocated to the mobile station 104; or if the mobile station 104 entered the Control Hold state 204 from the Active State 202, then the mobile station 104 may continue to use the Walsh code that it was using in the Active state. Upon identification and allocation of a Walsh code to the mobile station 104, execution proceeds to step 310.

Figure 4:
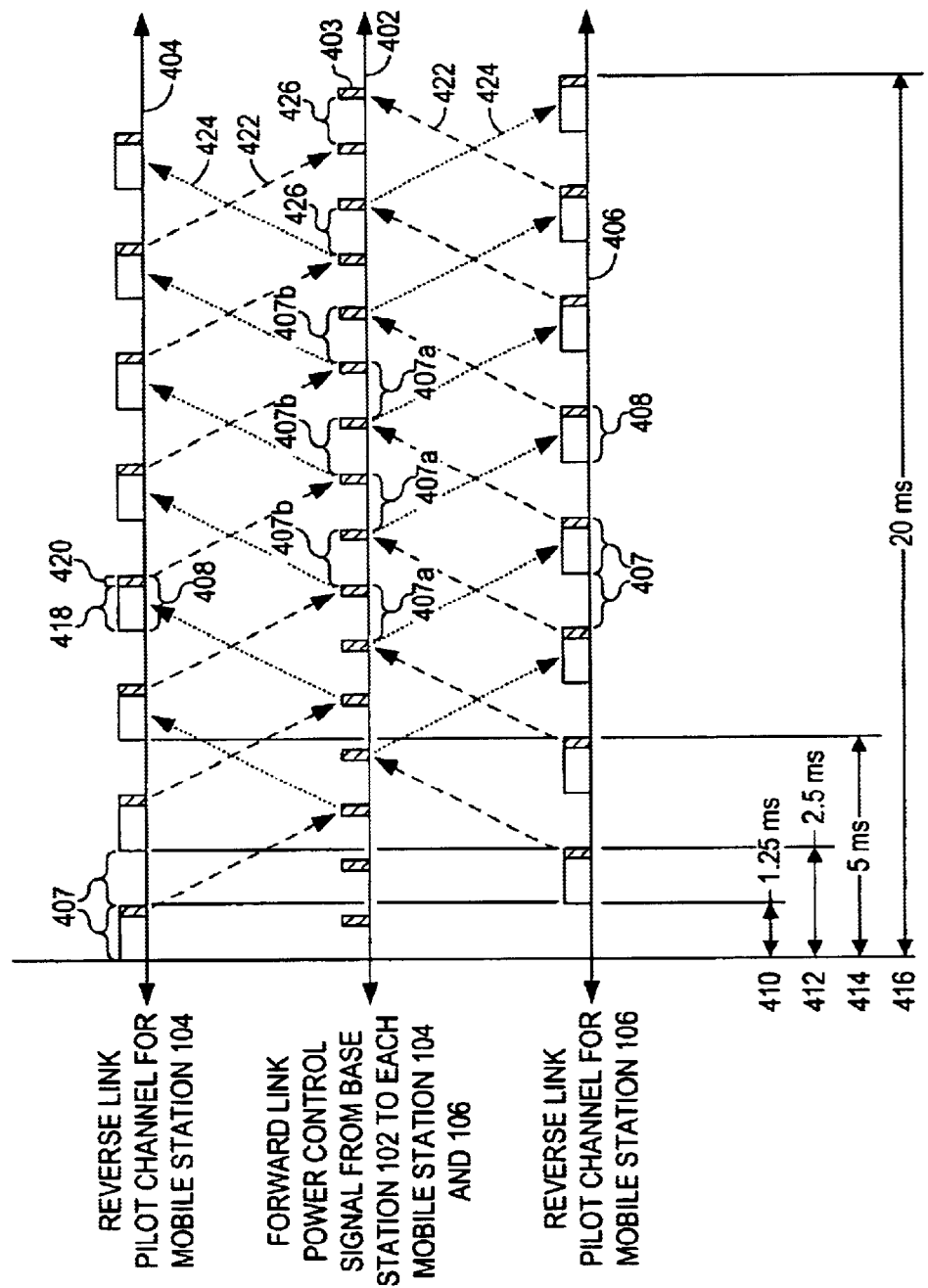
FIG. 4 is a schematic diagram showing the arrangement of time slots utilized by the forward link of the base station of FIG. 1 in accordance with features of the present invention.

In step 310, time slots, discussed further below with respect to FIG. 4, are allocated for the transmission of signals comprising a power control bit or a power control group (well-known in CDMA technology) on the forward and reverse links between the base station 102 and the mobile station 104 in the Control Hold state. Upon identification of such time slots, execution proceeds to step 312.

In step 312, at least one signal and, preferably, a plurality of signals, are communicated between the base station 102 and the mobile station 104, as discussed further below with respect to FIG. 4. Upon completion of the communication of such signals between the base station 102 and the mobile station 104, execution proceeds to step 314.

In step 314, a determination is made whether the mobile station 104 has exited from the Control Hold state 204 (FIG. 2). If it is determined that the mobile station 104 has exited from the Control Hold state 204, then execution returns to step 304; otherwise, execution returns to step 312.

FIG. 4 depicts a representative 20 millisecond (ms) frame of a timeline 402 representing the forward link of the base station 102 to the mobile stations 104 and 106, a timeline 404 representing the reverse link of the mobile station 104 to the base station 102, and a timeline 406 representing the reverse link of the mobile station 106 to the base station 102. The 20 ms frame, delineated by a dimension line 416, of each timeline 402, 404, and 406 is partitioned into sixteen time slots. Two time slots on each of the timelines 404 and 406 are designated representatively by the reference numeral 407, six time slots on the timeline 402 are designated representatively by the reference numeral 407a or 407b. As shown by the dimension lines 410, 412, and 414, each time slot 407 is defined by a duration of about 1.25 ms. It is understood that, depending on the version of CDMA implemented, the duration of each time slot 407, 407a, and 407b, and of each frame may vary in duration, and that the number of time slots 407, 407a, and 407b in each frame may vary.

If, in step 306 above, the gating rate 1/x is determined to be ½ (i.e., x=2), then, in accordance with step 310 above, every other time slot 407 on each timeline 404 and 406 is allocated for the transmission of a power control group, designated representatively by the reference numeral 408, from the mobile stations 104 and 106, respectively, across respective reverse links to the base station 102, as indicated schematically by dashed arrows 422. Each power control group 408 comprises a pilot signal 418 and a power control bit 420, well-known in the art. The time slots 407a and 407b on the timeline 402 are allocated for the transmission of power control bits 403 across respective forward links to alternate respective mobile stations 104 and 106, as indicated schematically by dotted arrows 424, in response to receipt of power control groups 408 transmitted from respective mobile stations 104 and 106. In as much as the power control bits 403 do not require an entire time slot 407a or 407b on the timeline 402, a first portion of each time slot 407a and 407b comprises a space 426 in which no signal is normally transmitted from the base station 102.

While not necessary for the operation of the present invention, the power control groups 408 on the timelines 404 and 406 are preferably aligned so that the power control groups 408 on the timelines 404 and 406 correspond with the spaces between power control groups 408 on the opposing timelines 406 and 404, respectively, such that power control groups 408 are substantially non-overlapping in time. The timeslots 407a and 407b allocated on the base station timeline 402 for each mobile 104 and 106 are non-overlapping, relative to time at the base station 102, but may overlap with timeslots 407 on either or both of timelines 404 and 406.

In the execution of step 312 of the flow chart 300, discussed above with respect to FIG. 3, each mobile station 104 and 106 preferably transmits a power control group 408 on its reverse link, as indicated schematically by the dashed arrows 422, to the base station 102 during respective time slots 407 allocated during step 310 (FIG. 3) on the timelines 404 and 406, as shown in FIG. 4. In response to the receipt of the pilot signal 418 of the power control group 408 transmitted from each mobile station 104 and 106, the base station 102 sends power control bits 403 over the respective forward links, as indicated schematically by the dotted arrows 424, to the respective mobile station 104 or 106 during the next time slot 407a or 407b allocated on the timeline 402 for the respective mobile station 104 or 106. In response to the receipt of the power control bit 420 of the power control group 408 transmitted from each mobile station 104, the base station 102 adjusts the power of signals transmitted to the mobile station 104 or 106.

Should any portion of signals transmitted from the two mobile stations 104 and 106 be received by the base station 102 simultaneously (e.g., resulting from mobile stations transmitting from different distances from the base stations), then the base station 102 may retrieve the entire transmission from each mobile station by processing the overlapping portion of the transmissions a first time using the long code of the mobile station 104, and a second time using the long code of the mobile station 106. It is understood that the long code of each mobile station is a pseudo-random sequence, unique to each mobile station, that the base station uses to distinguish between the transmissions from each mobile station on respective reverse links. Just as each Walsh code identifies a unique forward link communication channel, a long code identifies a unique reverse link channel.

In another aspect of the present invention, a mobile station 104 or 106 may enter into a soft handoff mode as the mobile station, in the Control Hold state 204, moves from a first sector to a second sector (not shown) of the cell 100 or of adjoining cells (not shown), and will require a Walsh code and time slot allocated from each sector. Time slots allocated at different sectors are chosen so they overlap in time. This is achieved preferably by requesting that the network poll the base station serving each sector for available time slots and Walsh codes, and determining which available time slot would require the least number of new Walsh codes to be issued, and allocating such time slot and Walsh code(s) to the mobile station. Alternatively, a mobile station 104 or 106 may indicate to a second sector the time slot being used with a first sector and request a Walsh code in an overlapping time slot.

A request that the mobile station 104 or 106 be transitioned out the Control Hold state 204 may be initiated by the respective mobile station 104 or 106 or the base station 102. The mobile station 104 or 106 may initiate such a request by overriding the gating rate and transmitting, in a manner well-known in the art, the request through a non-gated frame over the reverse link, indicated schematically by the dashed arrows 422. The non-gated frame may then be processed using the long code of the mobile station 104 or 106 that transmitted the request. Alternatively, the base station 102 may initiate such a request by transmitting a request piecemeal over the respective forward link, indicated schematically by the dotted arrows 424, during interstitial spaces, two of which spaces are depicted representatively by the reference numeral 426, allocated during timeslots 407 for the respective mobile station 104 or 106 on the timeline 402.

By the use of the present invention, wherein a gating rate of less than one is used, transmitted power on the forward link and reverse link is reduced over the prior art, thereby resulting in less interference and increased network capacity, at the expense of slightly poorer power control. Furthermore, the limited number of Walsh codes are more efficiently used, thereby further increasing capacity.

It is understood that the present invention can take many forms and embodiments. Accordingly, several variations may be made in the foregoing without departing from the spirit or the scope of the invention. For example, the duration of power control groups may be reduced by a few microseconds, such as ten microseconds, to avoid overlapping the transmission of signals from different mobile stations. Or, the transmission of a power control bit on a forward link may be replaced by any combination of pilot channel, power control sub-channel, or traffic channel bits, so long as such transmission constitutes one power control group (e.g., 1.25 ms as depicted in FIG. 4) in duration, and so long as transmissions on adjacent forward links directed to different mobile stations do not overlap.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A method for sharing Walsh codes between at least two mobile stations operating simultaneously in a Control Hold Medium Access Control (MAC) state in Code Division Multiple Access (CDMA), comprising for each respective mobile station, upon entry of the respective mobile station into the Control Hold MAC state, the following steps performed by a base station serving the respective mobile station:

a) determining a gating rate 1/x to be used by the respective mobile station, wherein x is greater than one;

b) identifying a Walsh code being used by less than x mobile stations in the control hold MAC state, and allocating the identified Walsh code to the respective mobile station to thereby define a channel of communication for the respective mobile station;

c) identifying a time slot which is not being used by the base station to transmit to any mobile stations using the identified Walsh code in the control hold MAC state, and allocating the identified time slot for transmission of at least one signal to the respective mobile station; and d) transmitting at least one signal between the base station and the respective mobile station using the identified Walsh code during the identified time slot.

2. The method of claim 1 wherein channel of communication defines the forward link between the base station and the respective mobile station.

3. The method of claim 1 wherein CDMA is CDMA2000.

4. The method of claim 1 wherein the at least one signal is a power control group.

5. The method of claim 1 wherein the at least one signal comprises a power control bit.

6. The method of claim 1 wherein the at least one signal comprises a pilot signal and a power control bit.

7. The method of claim 1 wherein the step of transmitting is repeated for each mobile station in a round robin manner.

8. The method of claim 1 wherein x is equal to 2, 4, or 8.

9. The method of claim 1 wherein each time slot has a duration of about 1.25 milliseconds.

10. The method of claim 1 wherein the at least two mobile stations comprise a first respective mobile station and a second respective mobile station, and wherein the method further comprises:
receiving simultaneously a first signal from the first mobile station and a second signal from the second mobile station;
using the long code of the first mobile station to retrieve the first signal; and
using the long code of the second mobile station to retrieve the second signal.

11. The method of claim 1 further comprising for a respective mobile station the steps of:
moving the respective mobile station from a first sector to a second sector;
determining which time slots and Walsh codes are available in the second sector; and
allocating a determined time slot and Walsh code to the respective mobile.

12. The method of claim 1 further comprising for a respective mobile station the steps of:
moving the respective mobile station from a first sector to a second sector;
determining which time slots and Walsh codes are available in the second sector;
identifying which time slot and Walsh code would require the least number of new Walsh codes to be issued; and
allocating the identified time slot and Walsh code to the respective mobile.

13. The method of claim 1 further comprising for a respective mobile station the steps of:
moving the respective mobile station from a first sector to a second sector;
determining whether a time slot and Walsh code used by the respective mobile station in the first sector is available in the second sector; and
upon a determination that a time slot and Walsh code used by the respective mobile station in the first sector is available in the second sector, allocating the identified time slot and Walsh code to the respective mobile in the second sector.

14. The method of claim 1 further comprising for a respective mobile station the step of transmitting piecemeal during time slots allocated for the respective mobile station by the base station over a forward link to the respective mobile station a request to transition the respective mobile station out of the Control Hold MAC state.

15. A computer program product for enabling Walsh codes to be shared between at least two mobile stations operating simultaneously in a Control Hold Medium Access Control (MAC) state in Code Division Multiple Access (CDMA), the computer program product having a medium with a computer program embodied thereon, the computer program comprising, for each respective mobile station, upon entry of the respective mobile station into the Control Hold MAC state:
a) computer program code for determining a gating rate 1/x to be used by the respective mobile station, wherein x is greater than one;
b) computer program code for identifying a Walsh code being used by less than x mobile stations in the control hold MAC state, and allocating the identified Walsh code to the respective mobile station to thereby define a channel of communication for the respective mobile station;
c) computer program code for identifying a time slot which is not being used by a base station to transmit to any mobile stations using the identified Walsh code in the control hold MAC state, and allocating the identified time slot for transmission of at least one signal to the respective mobile station; and
d) computer program code for transmitting at least one signal between the base station and the respective mobile station using the identified Walsh code during the identified time slot.

16. The computer program product of claim 15 wherein channel of communication defines the forward link between the base station and the respective mobile station.

17. The computer program product of claim 15 wherein CDMA is CDMA2000.

18. The computer program product of claim 15 wherein the at least one signal is a power control group.

19. The computer program product of claim 15 wherein the at least one signal comprises a power control bit.

20. The computer program product of claim 15 wherein the at least one signal comprises a pilot signal and a power control bit.

21. The computer program product of claim 15 wherein the step of transmitting is repeated for each mobile station in a round robin manner.

22. The computer program product of claim 15 wherein x is equal to 2, 4, or 8.

23. The computer program product of claim 15 wherein each time slot has a duration of about 1.25 milliseconds.

24. The computer program product of claim 15 wherein the at least two mobile stations comprise a first respective mobile station and a second respective mobile station, and wherein the method further comprises:
computer program code for receiving simultaneously a first signal from the first mobile station and a second signal from the second mobile station;
computer program code for using the long code of the first mobile station to retrieve the first signal; and
computer program code for using the long code of the second mobile station to retrieve the second signal.

25. The computer program product of claim 15 further comprising for a respective mobile station the steps of:
computer program code for moving the respective mobile station from a first sector to a second sector;
computer program code for determining which time slots and Walsh codes are available in the second sector; and
computer program code for allocating a determined time slot and Walsh code to the respective mobile.

26. The computer program product of claim 15 further comprising for a respective mobile station the steps of:
computer program code for moving the respective mobile station from a first sector to a second sector;
computer program code for determining which time slots and Walsh codes are available in the second sector;
computer program code for identifying which time slot and Walsh code would require the least number of new Walsh codes to be issued; and
computer program code for allocating the identified time slot and Walsh code to the respective mobile.

27. The computer program product of claim 15 further comprising for a respective mobile station the steps of:
computer program code for moving the respective mobile station from a first sector to a second sector;
computer program code for determining whether a time slot and Walsh code used by the respective mobile station in the first sector is available in the second sector; and computer program code, upon a determination that a time slot and Walsh code used by the respective mobile station in the first sector is available in the second sector, for allocating the identified time slot and Walsh code to the respective mobile in the second sector.

28. The computer program product of claim 15 further comprising for a respective mobile station, computer program code for transmitting piecemeal during time slots allocated for the respective mobile station by the base station over a forward link to the respective mobile station a request to transition the respective mobile station out of the Control Hold MAC state.

\* \* \* \* \*